United States Patent
Guth et al.

(10) Patent No.: US 6,345,825 B1
(45) Date of Patent: Feb. 12, 2002

(54) SEALING ARRANGEMENT

(75) Inventors: Wolfgang Guth, Laudenbach; Günter Bergmann, Heddesheim; Markus Von Geisau, Mannheim, all of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/375,711

(22) Filed: Aug. 17, 1999

(30) Foreign Application Priority Data

Aug. 28, 1998 (DE) .......................................... 198 39 297

(51) Int. Cl.⁷ ................................................ F16J 15/00
(52) U.S. Cl. ....................... 277/317; 277/572; 277/944; 384/448; 384/484
(58) Field of Search ................................ 277/317, 371, 277/390, 394, 410, 412, 512, 944; 384/448, 484

(56) References Cited

U.S. PATENT DOCUMENTS

| | | | |
|---|---|---|---|
| 4,373,486 A | * 2/1983 | Nichols et al. | 123/414 |
| 4,792,243 A | * 12/1988 | Takeuchi et al. | 384/486 |
| 4,850,722 A | * 7/1989 | Bayer | 384/448 |
| 4,852,536 A | * 8/1989 | Maier et al. | 123/414 |
| 4,940,248 A | * 7/1990 | Kilthau et al. | |
| 5,143,458 A | * 9/1992 | Alff et al. | 384/448 |
| 5,431,413 A | * 7/1995 | Hajzler | |
| 5,476,272 A | * 12/1995 | Hixson, II | |
| 5,530,344 A | * 6/1996 | Caillaut et al. | 324/174 |
| 5,575,568 A | * 11/1996 | Rigaux et al. | 384/448 |
| 5,579,732 A | * 12/1996 | Hajek | 123/190.14 |
| 5,611,545 A | * 3/1997 | Nicot | |
| 5,668,426 A | * 9/1997 | Lamert et al. | 310/168 |
| 5,713,577 A | * 2/1998 | Lannert et al. | |
| 5,755,517 A | * 5/1998 | Nicot | 384/448 |
| 5,863,124 A | * 1/1999 | Ouchi et al. | 384/448 |
| 5,947,611 A | * 9/1999 | Nagase | 384/448 |
| 5,969,518 A | * 10/1999 | Merklein et al. | 324/173 |
| 6,003,872 A | * 12/1999 | Nord | 277/317 |

FOREIGN PATENT DOCUMENTS

| | | | |
|---|---|---|---|
| EP | 000375019 A1 | * | 6/1990 |
| EP | 000378939 A1 | * | 7/1990 |
| EP | 000553716 A1 | * | 8/1993 |
| EP | 0 607 719 | | 7/1994 |
| EP | 000665436 A1 | * | 8/1994 |

* cited by examiner

*Primary Examiner*—Anthony Knight
*Assistant Examiner*—Alison K. Pickard
(74) *Attorney, Agent, or Firm*—Kenyon & Kenyon

(57) ABSTRACT

A sealing arrangement including a ring gasket having at least one dynamically stressed sealing lip which is in sealing contact with a first machine element. A multipole ring made of a magnetized elastomer material is connected to a carrier ring and is moveable past an rpm sensor for detecting rotational movement of the first machine element relative to a second machine element. The carrier ring has an essentially C-shaped profile which is open axially in the direction of the ring gasket and is connected in a rotationally fixed manner to the first machine element. A first leg of the carrier ring is connected to the first machine element has an end which is adjacent the sealing lip at an axial distance.

8 Claims, 1 Drawing Sheet

SEALING ARRANGEMENT

BACKGROUND OF THE INVENTION

The present invention relates to a sealing arrangement.

European Patent 0 607 719 A1 describes a sealing arrangement including a ring gasket with dynamically stressed sealing lips made of an elastomer material, with the dynamically stressed sealing lips surrounding the mating bearing surface of a carrier ring with a seal. The carrier ring is pressed onto the shaft to be sealed and carries a multipole ring made of a magnetized elastomer material. The sealing lips of the ring gasket are arranged on the side of the carrier ring facing away from the multipole ring, with one of the dynamically stressed sealing lips being designed as a ballast gasket. In the cassette form of the previously known sealing arrangement with the carrier ring pressed onto the shaft and forming the mating bearing surface for the dynamically stressed sealing lips, one disadvantage is that the carrier ring cannot be replaced without damaging the radially sloping sealing lip, and another is that the rpm sensor must be mounted axially, which is a problem in installation areas with limited space in the axial direction.

SUMMARY OF THE INVENTION

The object of the present invention is to eliminate these disadvantages and provide a sealing arrangement having improved use properties in this regard for a longer useful life.

To achieve this object, a sealing arrangement is presented which includes a ring gasket with at least one dynamically stressed sealing lip which is in sealing contact with a first machine element. In order to detect rotational movement of the first machine element relative to a second machine element, a multipole ring made of a magnetized elastomer material is connected to a carrier ring and is moveable past an rpm sensor. The carrier ring has an essentially C-shaped profile which is open axially in the direction of the ring gasket and which is rotationally fixedly connected to the first machine element, with the first leg of the carrier ring connected to the first machine element and the sealing lips being connected adjacent to one another with an axial distance there between. The axial width of the first leg yields a reliable, rotationally fixed connection to the first machine element, while also the end face of the first leg facing the ring gasket is adjacent to the sealing lip at an axial distance. One advantage of this design is that the carrier ring connected to the multipole ring may be readily replaced separately if needed without having to alter the relative assignment of the ring gasket with respect to the first machine element. Since the comparatively sensitive, dynamically stressed sealing lip does not come into contact with the carrier ring, damage or destruction to the sealing lip (which is made of a polymer material or a material with a low coefficient of friction such as PTFE) is safely prevented when replacing the carrier ring with the multipole ring.

The carrier ring is preferably made of a metallic material and is connected to the first machine element with a press fit in a rotationally fixed manner.

The second leg of the carrier ring that is radially opposite the first leg is preferably connected to the multipole ring. It is generally possible for the multipole ring to enclose the second leg only on the side facing away from the first machine element. However, from the standpoint of providing an improved and durable connection of the multipole ring to the carrier ring, it is also within the scope of the invention for the multipole ring to at least partially surround the end face, which is open in the direction of the ring gasket, of the second leg.

The multipole ring may form a labyrinth gland together with the second machine element. The labyrinth gland prevents abrasive impurities from the environment from affecting the dynamically stressed sealing lip.

The carrier ring and the multipole ring may be joined by adhesion. Preferably, the two parts are joined together by vulcanization. If the carrier ring is made of a metallic material, it is treated, for example, by zinc phosphatizing before vulcanization and coated with a bonding agent. Vulcanization reliably prevents any unwanted relative motion between the carrier ring and the multipole ring, thus permitting an especially accurate determination of the relative rotational speeds of the two machine elements.

The first machine element may be the crankshaft of an internal combustion engine, and the second machine element may be a crankcase or by a crankcase cover. For such an application, the sealing arrangement is especially advantageous because the rear end of the crankshaft is the ideal location for determining the running smoothness of the crankshaft.

BRIEF DESCRIPTION OF THE DRAWING

The sealing arrangement is explained in greater detail below with reference to the drawing, which shows one embodiment in a schematic diagram.

DETAILED DESCRIPTION OF THE INVENTION

Figure 1:
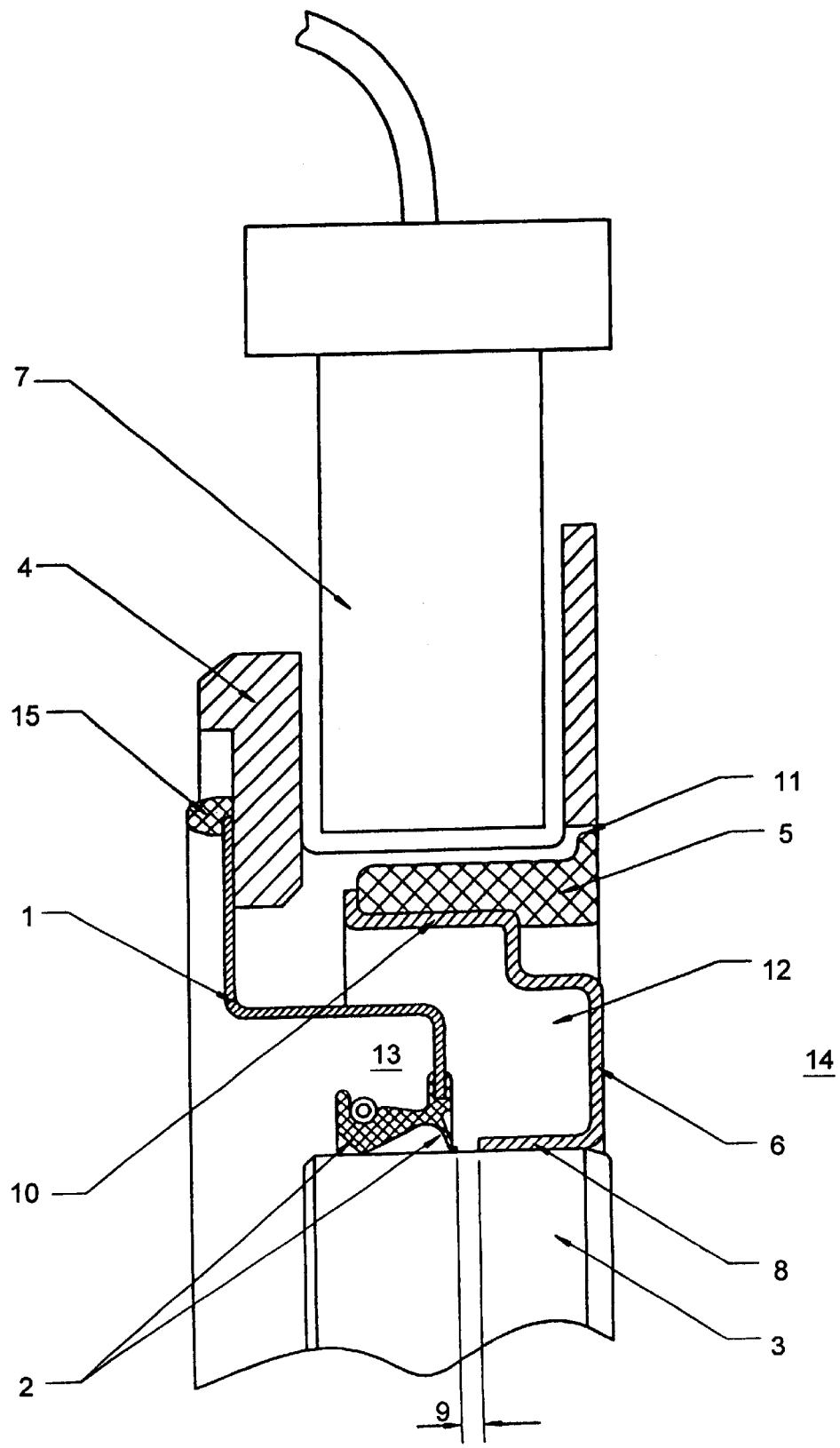

The drawing shows a detail of a crankcase cover of an internal combustion engine, where the crankcase cover is formed by second machine element 4 and surrounds first machine element 3, which in the illustrated embodiment is designed as the crankshaft, at a radial distance. Space 13 is sealed with respect to environment 14 by a ring gasket 1 arranged inside gap 12. In this embodiment, ring gasket 1 has two dynamically stressed sealing lips 2 and one statically stressed sealing lip 15 which provides a seal on the rear end of an engine block (not shown here). Another part of the sealing arrangement is formed by a multipole ring 5, which is made of a magnetized elastomer material and which has north and south poles in alternation in the peripheral direction, for example. Multipole ring 5 moves together with first machine element 3 about its axis and relative to stationary rpm sensor 7, with the north and south poles of multipole ring 5 passing by the relatively stationary rpm sensor 7 alternately for inductive detection of the rotational motion. The top dead center of a cylinder can be determined on the basis of a point of discontinuity in the sequence of north and south poles.

Carrier ring 6 has an essentially C-shaped profile which is open axially in the direction of ring gasket 1, with second leg 10 extending axially beyond dynamically stressed sealing lips 2. The first leg 8 of the carrier ring 6 is axially spaced from the stressed sealing lips 2, leaving a gap 9. This sealing arrangement provides for an especially compact design in the axial direction.

Multipole ring 5 together with second machine element 4 forms a labyrinth gland 11 to keep contaminants from environment 14 such as dirt, dust or abrasion fines from the clutch disk reliably away from dynamically stressed sealing lips 2.

What is claimed is:

1. A sealing arrangement, comprising:
a first machine element;
a second machine element;
a ring gasket having at least one dynamically stressed sealing lip which is in sealing contact with the first machine element;
a carrier ring having an essentially C-shaped profile which is open axially in the direction of the ring gasket and which is connected in a rotationally fixed manner to the first machine element via a first leg that is adjacent to and axially spaced from the sealing lip, the carrier ring having a second leg radially opposite the first leg, the second leg extending axially beyond the at least one dynamically stressed sealing lip, wherein the carrier ring is removable from the sealing arrangement without changing the relative assignment of the first machine element and the second machine element;
a multipole ring made of a magnetized elastomer material that is connected to the second leg of the carrier ring and that is moveable past an rpm sensor for detecting rotational movement of the first machine element relative to a second machine element.

2. The sealing arrangement according to claim 1, wherein the multipole ring together with the second machine element forms a labyrinth gland.

3. The sealing arrangement according to claim 1, wherein the multipole ring has an discontinuity point for determining top dead center of an internal combustion engine.

4. The sealing arrangement according to claim 1, wherein the carrier ring and the multipole ring are joined by adhesion.

5. The sealing arrangement according to claim 1, wherein the first machine element is the crankshaft of an internal combustion engine, and the second machine element is a crankcase.

6. The sealing arrangement according to claim 1, wherein the second leg has an end face open axially in the direction of the ring gasket, and the multipole ring at least partly surrounds the end face.

7. The sealing arrangement according to claim 1, wherein the carrier ring is removable from the sealing arrangement without changing the relative assignment of the first machine element and the ring gasket.

8. The sealing arrangement according to claim 7, wherein the second leg has an end face open axially in the direction of the ring gasket, and the multipole ring at least partly surrounds the end face.

* * * * *